(12) United States Patent
Tanzer et al.

(10) Patent No.: US 6,887,928 B2
(45) Date of Patent: May 3, 2005

(54) METHOD OF IMPROVING VISCOSITY STABILITY UPON ADDITION OF A COLORANT COMPONENT

(75) Inventors: Joseph David Tanzer, Fort Washington, PA (US); Jerome Michael Harris, Penllyn, PA (US); Henry Jude Eichman, Havertown, PA (US); Homayoun Jamasbi, Blue Bell, PA (US); Dennis Paul Lorah, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 265 days.

(21) Appl. No.: 10/025,706

(22) Filed: Dec. 26, 2001

(65) Prior Publication Data

US 2002/0165313 A1 Nov. 7, 2002

Related U.S. Application Data

(60) Provisional application No. 60/271,997, filed on Feb. 28, 2001, and provisional application No. 60/271,992, filed on Feb. 28, 2001.

(51) Int. Cl.$^7$ .............................. C08J 3/00; C08K 5/05; C08L 75/00
(52) U.S. Cl. ........................ 524/386; 524/507; 524/590; 524/591
(58) Field of Search .................................. 524/507, 591, 524/590, 386

(56) References Cited

U.S. PATENT DOCUMENTS

| 3,917,556 A | * | 11/1975 | Baurecht et al. |
| 5,137,571 A | * | 8/1992 | Eisenhart et al. |
| 5,270,399 A | | 12/1993 | Czornij et al. |
| 5,376,709 A | | 12/1994 | Lau et al. |
| 5,605,974 A | | 2/1997 | Carpenter et al. |

FOREIGN PATENT DOCUMENTS

| EP | 0460896 A2 | 12/1991 |
| EP | 0614950 A1 | 9/1994 |
| EP | 0747456 A2 | 12/1996 |
| EP | 0867481 A1 | 9/1998 |
| WO | WO 93/09187 | 5/1993 |
| WO | WO 00/22050 | 4/2000 |

* cited by examiner

*Primary Examiner*—Patrick D. Niland
(74) *Attorney, Agent, or Firm*—Kim R. Jessum; Gary D. Greenblatt

(57) ABSTRACT

A tinting composition containing a colorant component is disclosed. In addition, a method of improving the viscosity stability of a composition upon the addition of a colorant component employing an associative thickener, a macromolecular compound having a hydrophobic cavity, a dispersing resin and combinations thereof is disclosed.

8 Claims, No Drawings

METHOD OF IMPROVING VISCOSITY STABILITY UPON ADDITION OF A COLORANT COMPONENT

CROSS REFERENCE TO RELATED PATENT APPLICATION

This is a non-provisional application of prior U.S. provisional application Ser. No. 60/271,997 filed on Feb. 28, 2001 and prior U.S. provisional application Ser. No. 60/271,992 filed on Feb. 28, 2001.

This invention relates to a tinting composition and a method of improving the viscosity stability of a coating composition upon the addition of a colorant component.

Associative thickeners are water-soluble or water-swellable polymers that have chemically attached hydrophobic groups. The associative thickeners operate to thicken systems to which they are added by the non-specific associations, such as adsorption on surfaces and aggregation in solution akin to micellization, between the hydrophobic groups on the thickener molecules and moieties on the other components in the system, similar to the non-specific associations of conventional surfactants.

Since the hydrophobic association exhibited by associative thickeners is non-specific, it is greatly influenced by the presence of surfactants and water miscible organic solvents. The hydrophobes of surfactants may compete for adsorption sites on particle surfaces, and can hinder or enhance associations between thickener hydrophobes, depending on the surfactant HLB. Once an associative thickener is completely desorbed from a particle, such as a latex particle, it can behave like a non-absorbing thickener and flocculate the latex by the volume restriction process.

A classic problem in paints containing associative thickeners is a drop in mid-shear (Krebs-Stormer) viscosity when colorants that contain high levels of surfactant are added. This is especially problematic when the paint will be tinted to a deep tone because a high level of surfactant generally accompanies the colorant. Colorants are added to paints in units of milliliter of colorant per liter of paint (hereinafter referred to as "ml/liter") or ounces of colorant per gallon of paint (hereinafter referred to as "oz/gal"). Light-tint (pastel) paints typically contain no more than 31.2 ml/liter (4 oz/gal) of colorant. Mid-tone paints typically contain from greater than 31.2 ml/liter (4 oz/gal) to 62.5 ml/liter (8 oz/gal) of colorant. Deep tone paints typically contain at least 62.6 ml/liter (8 oz/gal) of colorant.

Generally, it is possible to formulate a light tint base at a high enough mid-shear viscosity that colorants added to it will not depress the viscosity to an unacceptable degree. Combinations of associative thickeners have been found to be less sensitive to colorant addition than the individual thickeners alone, in some cases. However, neither of these solutions is completely satisfactory because they either require tedious reformulation, added cost or both, particularly in deep tone paints.

U.S. Pat. No. 5,137,571 and U.S. Pat. No. 5,376,709 disclose methods for using cyclodextrin-containing compounds with associative thickeners for a number of uses, including to reduce the viscosity drop of formulations upon the addition of colorants to the formulation. In Example 9 of U.S. Pat. No. 5,137,571, β-cyclodextrin, β-cyclodextrin ethoxylate and β-cyclodextrin propoxylate were added to a latex paint formulation containing a hydrophobically-modified ethoxylated urethane resin ("HEUR") to form viscosity-stabilized latex paint formulations. The Krebs-Stormer viscosity of each formulation was measured. Two ounces/gallon of paint of predispersed lampblack colorant were added to the viscosity-stabilized latex paint formulations and the Krebs-Stormer viscosity of each formulation was again measured. The use of post-added cyclodextrin in each case provided a reduction in the viscosity change before and after colorant addition relative to a control system containing no cyclodextrin. The same trend was shown in Example 2 (Table 3.1) of U.S. Pat. No. 5,376,709.

One of the drawbacks of the approach disclosed in U.S. Pat. No. 5,137,571 and U.S. Pat. No. 5,376,709 is that a single level of cyclodextrin was added to the paint formulation. This does not take into account the type and level of colorant that may be added during the tinting process. As such, if the type and level of cyclodextrin is optimized for one particular colorant, such as lampblack colorant of Example 9 supra, then it is unlikely that the type and level of cyclodextrin will be optimized for any other type of colorant. Thus, in some cases too much cyclodextrin may be employed and in some cases too little cyclodextrin may be employed. If the formulation utilizes the maximum level of cyclodextrin to counteract the largest expected viscosity drop (based on colorant type and level), then excess cyclodextrin will used for most formulations. This is a wasteful and costly approach.

Many conventional tinting machines employ twelve different colorants to mix the large palette of colors typically offered for most paint lines. Thus, it would be highly desirable to tailor the viscosity stability of any given formulation based on the type and level of colorant component to be added so the proper type and level of cyclodextrin is employed. The composition and method of the present invention provide such a solution.

The first aspect of this invention provides a tinting composition containing at least one colorant composition and from 0.05 to 15% dry weight of at least one additive selected from associative thickener and macromolecular compound having a hydrophobic cavity, based on the weight of the at least one colorant composition.

The second aspect of the present invention provides a method of improving the viscosity stability of a coating composition upon the addition of a colorant component, including the steps of: providing a base paint; and adding to the base paint, a tinting composition containing at least one colorant composition and from 0.05 to 15% dry weight of at least one additive selected from associative thickener and macromolecular compound having a hydrophobic cavity, based on the weight of the at least one colorant composition.

As used herein, "universal colorant" shall mean a colorant that is compatible with both water-based and nonaqueous-based compositions.

As used herein, "compatible" shall mean the mixture of the colorant component and base do not evidence signs of colloidal instability such as flocculation. Preferably, the mixture exhibits less than 5 g of residue such as gel and grit per liter of the composition when the composition is passed through a 200 mesh screen, more preferably less than 1 g of residue.

As used herein, pigment volume concentration (referred to herein as "PVC") is a measure of how "binder-rich" a formulation is. It is calculated herein by the following formula:

$$PVC = 100\% \times \frac{\text{(volume of pigment(s) + volume of extender(s))}}{\text{(volume of pigment(s) + volume of extender(s) + volume of binder(s))}}$$

As used herein, volume solids content ("VS" herein) is the dry volume of pigment(s) plus the dry volume of extender(s) plus the dry volume of binder(s). It is calculated herein by the following formula:

$$VS = 100\% \times \frac{\text{(dry volume of pigment(s) + dry volume of extender(s) + dry volume of binder(s))}}{\text{(total volume of formulation)}}$$

If additives are present, their volumes are not included in determining the total dry volume.

As used herein, "KU" shall mean Krebs unit and is a measure of the mid-shear viscosity as measured by a Krebs-Stormer viscometer.

As used herein, "viscosity stability" shall mean the ability of a composition to resist change in viscosity as measured by KU upon the addition of surfactant or a composition containing surfactant. A preferred viscosity stabilizer for latex paints must provide KU viscosity changes of less than about 10 units upon the addition of up to 93.7 ml/liter (12 oz/gal) of colorant. A more preferred viscosity stabilizer for latex paints must provide KU viscosity changes of less than about 5 units upon the addition of up to 93.7 ml/liter (12 oz/gal) of colorant.

The present invention relates to a tinting composition useful for preparing a coating composition with improved viscosity stability. The tinting composition contains at least one colorant composition and at least one additive. The tinting composition may be employed as an universal colorant.

The colorant composition is a material or mixture of materials added to a composition to impart color to another substance or mixture of materials (herein, to the "base paint") and includes pigments, metal effect agents, and combinations thereof. Examples of suitable pigments include titanium dioxide white, carbon black, lamp black, black iron oxide, red iron oxide, yellow iron oxide, brown iron oxide (a blend of red and yellow oxide with black), phthalocyanine green, phtalocyanine blue, organic red pigment (such as naphthol red, quinacridone red and toulidine red), quinacridone magenta, quinacridone violet, DNA orange, and organic yellow pigment (such as Hansa yellow) and combinations thereof. An examples of a metal effect agent includes mica having a titanium dioxide layer.

The colorant composition includes surfactants and optionally dispersants to aid in the dispersion and the stabilization of the pigments or the metal effect agents in the liquid medium of the colorant composition. The liquid medium may contain water, glycols such as ethylene glycol and propylene glycol, and alcohols such as isopropanol. Other materials commonly included in colorant compositions are dispersing resins; polyethylene oxide polymers; polyethylene oxide glycols; extenders such as talc and calcium carbonate; humectants; thickeners; defoamer; dispersing resin; and biocides.

The tinting composition may contain more than one colorant composition. For example, a tinting composition having a brown hue may be prepared by combining a red colorant composition and a yellow colorant composition.

The tinting composition of the present invention also contains at least one additive to compensate for the viscosity decrease which occurs upon the addition of the colorant composition to a base paint. The additive is an associative thickener or a macromolecular compound having a hydrophobic cavity. The tinting composition may contain one or more associative thickeners, one or more macromolecular compounds having a hydrophobic cavity, or a combination thereof. The level and the type of the associative thickener, and the level and the type of the macromolecular compound having a hydrophobic cavity is chosen to provide a tinting composition that reduces the viscosity decrease upon addition to a base paint. Factors affecting the choice of the associative thickener are the hydrophobe level, the hydrophobe type, and the molecular weight of the associative thickener. Further, it is desirable that the tinting composition has a viscosity which allows easy handling and permits facile mixing into a base paint.

The associative thickener is a water-soluble or water-swellable polymer that has chemically attached hydrophobic groups. Examples of associative thickeners include nonionic hydrophobically modified ethylene oxide urethane block copolymers (referred to herein as "HEUR"), hydrophobically modified alkali soluble polymers including hydrophobically modified alkali soluble emulsions (referred to herein as "HASE"), hydrophobically-modified celullosics, including hydrophobically-modified hydroxyethyl cellulose (referred to herein as "HMHEC"), hydrophobically modified poly(acrylamide), and mixtures thereof. The tinting composition may contain 0.05 to 15% dry weight, preferably from 0.1 to 12% dry weight, and more preferably, from 0.2 to 10% dry weight of the one or more associative thickeners, based on the total weight of the colorant composition.

The macromolecular organic compound having a hydrophobic cavity is a compound which may complex with surfactant to diminish the viscosity lowering effect of the surfactant on the coating composition. Examples of macromolecular organic compounds having a hydrophobic cavity include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives refers to α-cyclodextrins, β-cyclodextrins, and γ-cyclodextrins in which at least one hydroxyl group located on the rim of the cyclodextrin ring have been functionalized with a substituent group such as methyl, acetyl, hydroxypropyl, and hydroxyethyl groups. Cyclodextrin derivatives also include cyclodextrin molecules with multiple substituent groups including cyclodextrin molecules with more than one type of substituent group. Cyclodextrin derivatives do not include polymers with more than one attached cyclodextrin ring. Preferred cyclodextrin derivatives are methyl-β-cyclodextrin and hydroxypropyl-β-cyclodextrin. Methyl-β-cyclodextrin is the most preferred cyclodextrin derivative.

The cyclic oligosaccharides having a hydrophobic cavity, such as cycloinulohexose, cycloinuloheptose, useful in the composition and method of the invention are described by Takai et al., *Journal of Organic Chemistry*, 1994, volume 59, number 11, pages 2967–2975.

The calyxarenes useful in the composition and method of the invention are described in U.S. Pat. No. 4,699,966, WO 89/08092; JP-A- 88/197544 and JP-A-89/007837.

The cavitands useful in the composition and method of the invention are described in Italian application 22522 A/89 and Moran et al., *Journal of the American Chemical Society*, volume 184, 1982, pages 5826–5828.

The non-cyclic polysaccharides useful in the composition and method of the invention are described in PCT application WO 98/24821. Suitable non-cyclical polysaccharides include both unmodified polysaccharides and modified polysaccharides which are partially or totally derivatized on the hydroxyl groups.

The tinting composition may contain 0.05 to 15% dry weight, preferably from 0.1 to 12% dry weight, and more preferably, from 0.2 to 10% dry weight of the one or more macromolecular organic compounds having a hydrophobic cavity, based on the total weight of the colorant composition.

Dispersing resins such as styrenated acrylates may be added to the tinting composition in aid in the dispersion or stability of the pigments and metal effecting agents.

In one embodiment, the tinting composition contains at least one associative thickener and at least one macromolecular compound having a hydrophobic cavity. The total level of the associative thickener and the macromolecular compound having a hydrophobic cavity is in the range of 0.05 to 15% dry weight, preferably from 0.1 to 12% dry weight, and more preferably, from 0.2 to 10% dry weight, based on the total weight of the colorant composition. In a preferred embodiment, the ratio of the associative thickener and the macromolecular compound having a hydrophobic cavity is in the range of 4:1 to 1:4, preferably in the range of 3:1 to 1:3, and more preferably in the range of 2:1 to 1:2, based on the dry weights of the associative thickener and the macromolecular compound having a hydrophobic cavity.

In one embodiment, the tinting composition contains at least one associative thickener and at least one macromolecular compound having a hydrophobic cavity. In this embodiment, the ratio of these two additives is such that the moles of the macromolecular compound having a hydrophobic cavity compared to the moles of hydrophobe groups of the associative thickeners is in the range of 1:1 to 1.1:1.

The tinting composition of this invention may be added to a base paint to prepare the coating composition. The tinting composition is added to change the color of the base paint, or to modify the color or the appearance of a coating prepared from the coating composition. The base paint may be a nonaqueous base paint or an aqueous base paint. Further, the base paint may be a neutral base paint useful for preparing clear coatings or a white base paint. The neutral base paint does not contain titanium dioxide or other materials which provide opacity. The white base paint typically contains titanium dioxide or another white pigments and is used to prepare opaque coatings.

The titanium dioxide is contained in the white base paint as particles. The titanium dioxide particles typically have an average diameter in the range of 80 nm to 250 nm and may have a coating of silica or a coating of alumina. Suitable forms of titanium dioxide include rutile titanium dioxide and anatase titanium dioxide. The white base paint may contain titanium dioxide at a level of 58 g/liter to 2034 g/liter (10 lbs/100 gal to 350 lbs/100 gal of aqueous base paint.

The nonaqueous base paint contains polymer binder such as acrylic copolymers, polyurethane polymers, polysulphide polymers, and alkyds; and solvents such as toluene, alcohols, and ketones.

The aqueous base paint contains polymer binder and rheology modifier. The polymer binder is dispersed as polymer particles in the aqueous medium of the aqueous base paint and may have average particle diameters in the range of 20 nm to 1000 nm. Suitable polymer binders include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate copolymers, styrene/butadiene copolymers polyester polymer, polyethers and the like, and mixtures thereof. The polymer binder may be provided as an aqueous dispersion such as an emulsion polymer. The polymer binder may be chosen to provide a coating, which is prepared from the aqueous coating composition, with properties such as adhesion to a substrate, gloss, abrasion resistance, and barrier properties such as moisture resistance and solvent resistance. The level of binder in the aqueous base paint may be in the range of 145 g/liter to 2034 g/liter (25 dry lbs/100 gal to 350 dry lbs/100 gal) of the aqueous base paint.

The aqueous base paint also contains at least one rheology modifier to thicken the aqueous base paint and to modify the rheology to allow application on substrates without excessive splattering or dripping of the aqueous coating composition, or sag of the wet paint film. Typically more than one rheology modifier is added to a paint to provide an aqueous paint with the desired rheology. Suitable rheology modifiers include nonhydrophobically modified rheology modifiers such as hydroxyethyl cellulose (HEC), alkali soluble emulsions (ASE), and polyvinyl alcohol; and hydrophobically modified rheology modifiers, also referred to as associative thickeners, such as hydrophobically modified ethylene oxide urethane block copolymers (referred to herein as "HEUR"), hydrophobically modified alkali soluble polymers including hydrophobically modified alkali soluble emulsions (referred to herein as "HASE", hydrophobically-modified celullosics, including hydrophobically-modified hydroxyethyl cellulose (referred to herein as "HMHEC"), hydrophobically modified poly(acrylamide); and mixtures thereof. The rheology modifier may be present at a level of 5.8 g/liter to 116 g/liter (1 lb/100 gal to 20 lb/100 gal) of the aqueous base paint.

As used herein, a "volatile organic compound" (VOC) is defined herein as a carbon containing compound that has a boiling point below 280° C. at atmospheric pressure, compounds such as water and ammonia being excluded from VOCs. A volatile organic compound (VOC) may be added to a coating composition to improve the film properties or to aid in the application properties of the coating composition. Examples of such compounds include solvents and coalescents such as glycol ethers, organic esters, aromatic compounds, ethylene and propylene glycol, and aliphatic hydrocarbons.

In one embodiment, the aqueous base paint is a low VOC composition containing from 0 to less than 6% VOC by weight, preferably from 0 to less than to 3% VOC, and more preferably from 0 to less than 2% VOC, based on the total weight of the aqueous base paint. An aqueous coating composition containing from 0 to less than 6% VOC by weight, preferably from 0 to less than to 3% VOC, and more preferably from 0 to less than 2% VOC, based on the total weight of the aqueous coating composition, may be prepared from an aqueous base paint having a low VOC composition.

In one embodiment, the base paint contains at least one associative thickener. The associative thickener may be present in the aqueous composition at a level of at least 0.05% by weight of solids, based on the weight of the composition.

The method of this invention includes the step of adding the tinting composition of this invention to a base paint to prepare a coating composition. This step is easily achieved by the addition of the tinting composition with mixing.

The composition and method of the invention are useful for improving the viscosity stability of a composition, particularly upon the addition of a colorant component containing high levels of surfactant. The composition and method of the invention are not limited by the type of colorant component that is added to the composition and are useful for any colorant component that contains surfactant or other additives that may interfere with the non-specific associations of the associative thickeners added to the composition.

The method of this invention includes the step of adding the tinting composition of this invention to a base paint to prepare the coating composition. This step is easily achieved by the addition of the tinting composition with mixing. The amount of tinting composition added to the base paint may be in the range of 7.8 ml/liter (1 oz/gal) to 31.2 ml/liter (4 oz/gal) to prepare a light-tint coating composition, from 31.2 ml/liter (4 oz/gal) to 62.5 ml/liter (8 oz/gal) to prepare a mid-tone coating composition, and from 62.5 ml/liter (8 oz/gal) to 93.7 ml/liter (12 oz/gal) to prepare a deep tone coating composition.

The tinting composition and the method of this invention are useful for improving the viscosity stability of a coating composition, particularly upon the addition of the tinting composition to a base paint containing at least one associative thickener. The composition and method of the invention are not limited by the type of pigment that is added to the coating composition.

The water-resistance properties, including blister resistance, wet adhesion, and scrub resistance of the compositions prepared using the tinting composition and method of this invention, are expected to be improved because of the low molecular weight materials such as surfactants may be complexed with the macromolecular compounds having a hydrophobic cavity. Further, coating compositions prepared using the tinting compositions and the method of this invention, may react more predictably to added tinting compositions, making color matching easier and facilitating the use of software for color matching. Also, viscosity fluctuation in the coating composition is expected to be reduced. Further, the freeze-thaw stability of the coating composition, the dispensing of the tinting composition (no clogs) and the sag resistance properties of wet films prepared from coating compositions using the tinting compositions and method of the invention are expected to be improved.

The coating composition may be free of organic solvent or it may contain a coalescing solvent. The coating composition may contain typical coating additives such as fillers, defoamers, cross-linkers, catalysts, surfactants, stabilizers, anti-flocculants, coalescents, waxes, antioxidants, and suitable solvents, such as water miscible solvents.

The coating composition of this invention may be applied by methods well known in the art such as air-assisted spray, airless spray, plural component spray, brush, roller squeegee, roll coater, curtain coater, and the like. Substrates to which the coating composition may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, aluminum, wrought iron, drop forged steel, and stainless steel; previously painted or primed surfaces (fresh, aged, or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; and leather. The coating composition may be used, for example, as a wood coating, maintenance coating, interior or exterior wall coating, metal primer or coating, plastics coating, traffic paint, leather coating, coil coating, architectural coating. Coatings prepared from the coating composition may be flat coatings, satin coatings, semi-gloss coatings, gloss coatings, primer, textured coatings, and the like.

The tinting composition and method of the present invention are particularly useful in systems employing delayed product differentiation, including tinting and mixing of the product components at the point-of-manufacture, point-of-sale or point-of-use, such as those disclosed in U.S. Provisional Applications Ser. Nos. 60/183,655 filed Feb. 18, 2000, 60/183,656 filed Feb. 18, 2000, and 60/247,639 filed Nov. 10, 2000.

All ranges used herein are inclusive and combinable. Some embodiments of the present invention will now be described in detail in the following Examples.

The Krebs-Stormer viscosity was measured using ASTM method D562.

EXAMPLE 1

Preparation of Base Paint Containing HEUR Associative Thickener

A base paint was prepared containing associative thickeners. The associative thickeners were hydrophobically modified ethylene oxide urethane block copolymers. First, a paint grind was prepared by combining the materials in the order listed in Table 1.1.

TABLE 1.1

| Paint Grind | |
|---|---|
| Material | Amount |
| propylene glycol | 34.56 g |
| Water | 25.04 g |
| Tamol ™ 731 dispersant | 6.89 g |
| clay | 70.00 g |
| Foamaster ™ PL defoamer | 0.89 g |
| Nurosept 95 biocide | 0.07 g |

Tamol is a trademark of Rohm and Haas Company.
Foamaster is a trademark of Cognis Corp.
Nurosept is a trademark of the Huls America Corp.

Next, a base paint was prepared by combining the paint grind with the materials listed in Table 1.2.

TABLE 1.2

| Base Paint Containing HEUR Associative Thickener | |
|---|---|
| Material | Amount |
| Water | 150.25 g |
| Acrysol ™ SCT-275 rheology modifier (HEUR) | 26.00 g |
| ammonia (28%) | 2.00 g |
| Triton ™ X-100 surfactant | 4.45 g |
| Texanol ™ coalescent | 15.80 g |
| propylene glycol | 8.64 g |
| polyvinyl acetate polymer binder | 472.50 g |
| propylene glycol | 8.64 g |
| polyvinyl acetate polymer binder | 472.50 g |

Acrysol is a trademark of Rohm and Haas Company.
Triton is a trademark of Dow Chemical Co.

TABLE 1.2-continued

Base Paint Containing HEUR Associative Thickener

| Material | Amount |
|---|---|

Texanol is a trademark of Eastman Chemical Co.
Isopar is a trademark of Exxon Corp.

The base paint is an aqueous base paint containing a HEUR associative thickener and had a pH of 8.4, a PVC of 10.5% and a VS of 30%.

EXAMPLE 2

Preparation of Base Paint Containing HASE Associative Thickener

A base paint was prepared containing an associative thickener. The associative thickener was a hydrophobically modified alkali soluble emulsion. First, a paint grind was prepared by according to the procedure in Table 1.1. Next, a base paint was prepared according to the procedure in Table 1.2 except that 14.00 g of Acrysol™ DR-73 rheology modifier (HASE) was substituted for the Acrysol™ SCT-275 rheology modifier.

The base paint was an aqueous base paint containing a HASE associative thickener and had a pH of 8.5, a PVC of 10.5%, and a VS of 30%.

EXAMPLE 3

Coating Composition Containing Tinting Composition Containing Associative Thickener and Macromolecular Compound Having a Hydrophobic Cavity An additive mixture was prepared by combining 2 parts by dry weight of Acrysol™ RM-8 rheology modifier (Rohm and Haas Company), an HEUR associative thickener, and 1 part by dry weight of methyl-β-cyclodextrin. The additive mixture was added to several colorant compositions at levels of 5, 10 and 15 dry weight % with mixing to prepare the tinting compositions.

The coating compositions were prepared by mixing the tinting compositions into the base paints of Example 1 and Example 2 at a level of 93.7 ml/liter (12 oz/gal). The Krebs-Stormer viscosity of the coating compositions were measured prior to and 24 hours after the addition of the tinting compositions.

TABLE 3.1

Viscosity Decrease (KU) for Coating Composition Containing HEUR Rheology Modifier and Tinting Composition

| % Additive Mixture in Tinting Composition | White | Blue | Yellow | Black |
|---|---|---|---|---|
| 0 | −11 | −28 | −18 | −32 |
| 5 | 1 | −23 | −7 | −25 |
| 10 | 8 | −15 | −1 | −18 |
| 15 | 15 | 10 | 7 | −11 |

TABLE 3.2

Viscosity Decrease (KU) for Coating Composition Containing HASE Rheology Modifier and Tinting Composition

| % Additive Mixture in Tinting Composition | White | Blue | Yellow | Black |
|---|---|---|---|---|
| 0 | −2 | −12 | −6 | −10 |
| 5 | 12 | −6 | 12 | −5 |
| 10 | 23 | −1 | 14 | 3 |
| 15 | 34 | 7 | 23 | 13 |

The results in Table 3.1 and Table 3.2 show that the tinting compositions containing the combination of associative thickener and macromolecular compound having a hydrophobic cavity as additives provided coating compositions with smaller viscosity decreases compared the colorant composition which did not contain an additive.

EXAMPLE 4

Coating Composition Containing Tinting Composition Containing Associative Thickener A base paint was prepared containing associative thickeners. The associative thickeners were hydrophobically modified ethylene oxide urethane block copolymers. First, a titanium dioxide grind was prepared by combining the materials in the order listed in Table 4.1.

TABLE 4.1

Titanium Dioxide Grind

| Material | Amount |
|---|---|
| Water | 53.11 g |
| propylene glycol | 1.70 g |
| Tamol ™ 731 dispersant | 1.00 g |
| Triton ™ CR-10 surfactant | 0.07 g |
| Foamaster ™ VL defoamer | 0.10 g |
| Kathon ™ LX (1.5%) | 0.07 g |
| Rhoplex ™ SG-10M polymer binder | 200.00 g |
| Ti-Pure ™ R-706 titanium dioxide | 25.00 g |
| Acrysol ™ RM-2020 NPR rheology modifier | 10.00 g |
| Water | 50.00 g |

Kathon, Rhoplex, and Acrysol are trademarks of Rohm and Haas Company.
Foamaster is a trademark of Cognis Corp.
Ti-Pure is a trademark of E.I. DuPont de Nemours and Co.

Next, a base paint was prepared by combining the titanium dioxide grind with the materials listed in Table 4.2.

TABLE 4.2

Aqueous Base Paint Formulation

| Material | Amount |
|---|---|
| Water | 62.78 g |
| Rhoplex ™ SG-10M polymer binder | 403.13 g |
| Ropaque ™ Ultra plastic pigment | 5.60 g |
| Texanol ™ coalescent | 30.33 g |
| ammonia (28%) | 1.43 g |
| Acrysol ™ RM-2020 NPR rheology modifier | 14.24 g |
| Acrysol ™ RM-825 rheology modifier | 0.65 g |
| Foamaster ™ VL defoamer | 2.00 g |
| water | 25.00 g |

Ropaque is a trademark of Rohm and Haas Company.
Texanol is a trademark of Eastman Chemical Co.

The base paint was an aqueous base paint containing HEUR associative thickeners and had a PVC of 3.3% and a VS of 33.8%.

A phthalo blue colorant composition (100 g) was formulated with 10.5 g of Acrysol™ RM-825 rheology modifier (25% active) and 6 g water to prepare the tinting composition. The Acrysol™ RM-825 rheology modifier is a HEUR associative thickener. The coating composition, Example 4.1, was prepared by admixing 20.51 g of the tinting composition into 100 g of the base paint. A comparative coating composition, Comparative A, was prepare by adding 100 g of the phthalo blue colorant composition and 16.5 g water to the base paint.

Table 4.3

Viscosity Decrease (KU) for Coating Composition Containing HEUR Rheology Modifier and Tinting Composition Containing Associative Thickener

| Coating Composition | Viscosity Change (KU) |
|---|---|
| Example 4.1 | −15 |
| Comparative A | −27 |

The results in Table 4.3 show that the tinting composition of this invention, which contains an associative thickener, provided a coating composition with a smaller decrease in viscosity compared to the comparative coating composition containing the colorant composition.

EXAMPLE 5

Coating Composition Containing Tinting Composition Containing Macromolecular Compound Having a Hydrophobic Cavity The base paint was an aqueous base paint containing HEUR associative thickeners, prepared in Example 4.

A phthalo blue colorant composition (100 g) was formulated with 0.85 g methyl-β-cyclodextrin (50% active) and 15.65 g water to prepare the tinting composition. The coating composition, Example 5.1, was prepared by admixing 20.51 g of the tinting composition into 100 g of the base paint. A comparative coating composition was Comparative A of Example 4.

TABLE 5.1

Viscosity Decrease (KU) for Coating Composition Containing HEUR Rheology Modifier and Tinting Composition Containing Macromolecular Compound Having a Hydrophobic Cavity

| Coating Composition | Viscosity Change (KU) |
|---|---|
| Example 5.1 | −23 |
| Comparative A | −27 |

The results in Table 5.1 show that the tinting composition of this invention, which contains a macromolecular compound having a hydrophobic cavity, provided a coating composition with a smaller decrease in viscosity compared to the comparative coating composition containing the colorant composition.

We claim:

1. A method of improving the viscosity stability of a coating composition upon the addition of a colorant component, comprising the steps of:
   a) providing a base paint; and
   b) adding to said base paint, a tinting composition comprising:
      i) at least one colorant composition; and
      ii) from 0.05 to 15% dry weight of at least one macromolecular compound having a hydrophobic cavity, based on the weight of said at least one colorant composition.

2. The method of claim 1 wherein said tinting composition further comprises from 0.05 to 15% dry weight of an associative thickener.

3. The method according to claim 1 or 2 wherein said base paint comprises at least one associative thickener selected from the group consisting of nonionic hydrophobically modified ethylene oxide urethane block copolymer, hydrophobicallly modified alkali soluble polymer, hydrophobically-modified cellulosic, hydrophobically-modified polyacrylamide, and mixtures thereof.

4. The method according to claim 1 or 2 wherein said base paint is a nonaqueous base paint.

5. The method according to claim 1 or 2 wherein said base paint is an aqueous base paint comprising a volatile organic compound level in the range of from zero to less than 6% by weight, based on total weight of said aqueous base paint.

6. The method according to claim 5 wherein said volatile organic compound level is in the range of from zero to less than 3% by weight, based on total weight of said aqueous base paint.

7. The method according to claim 6 wherein said volatile organic compound level is in the range of from zero to less than 2% by weight, based on total weight of said aqueous base paint.

8. The method according to claim 1 or 2 wherein said at least one colorant composition consists essentially of:
   i) pigment or metal effect agent,
   ii) surfactant,
   iii) water, glycol, or alcohol, and
   iv) optionally, dispersant, dispersing resin, polyethylene oxide polymer, polyethylene oxide glycol, extenders, humectants, thickeners, defoamer, or biocide.

* * * * *